INVENTOR.
George E. Platzer, Jr.
BY Lon H. Romanski
ATTORNEY

Dec. 24, 1968 G. E. PLATZER, JR 3,418,488

SWITCHING CIRCUIT

Filed Oct. 23, 1965 5 Sheets-Sheet 2

INVENTOR.
George E. Platzer, Jr.
BY Lon H. Romanski
ATTORNEY

Dec. 24, 1968 G. E. PLATZER, JR 3,418,488

SWITCHING CIRCUIT

Filed Oct. 23, 1965 5 Sheets-Sheet 3

INVENTOR.
George E. Platzer, Jr.
BY Lon H. Romanski
ATTORNEY

Dec. 24, 1968 G. E. PLATZER, JR 3,418,488

SWITCHING CIRCUIT

Filed Oct. 23, 1965 5 Sheets-Sheet 4

INVENTOR.
George E. Platzer, Jr.
BY Lon H. Romanski
ATTORNEY

Dec. 24, 1968 G. E. PLATZER, JR 3,418,488

SWITCHING CIRCUIT

Filed Oct. 23, 1965 5 Sheets-Sheet 5

INVENTOR.
George E. Platzer, Jr.
BY Lon H. Romanski
ATTORNEY

United States Patent Office 3,418,488

Patented Dec. 24, 1968

3,418,488

SWITCHING CIRCUIT

George E. Platzer, Jr., Southfield, Mich., assignor to Lon H. Romanski, Detroit, Mich.

Filed Oct. 23, 1965, Ser. No. 502,948
6 Claims. (Cl. 307—114)

ABSTRACT OF THE DISCLOSURE

Typically, a circuit adapter provides additional switching members which when employed with, for example, a switched electrical wall outlet enables the energization of a load, remotely situated from said outlet, with either one of the additional switching members or the switch controlling the switched wall outlet.

This invention relates generally to electrical switching circuits and more particularly to such electrical circuitry which provides means whereby the circuitry can be completed by a switch remote from an electric current consuming device as well as by a switch in close proximity to said device.

In a great majority of the homes presently being built, it is accepted practice to eliminate ceiling-mounted electric lamps. In such instances a plurality of wall-mounted dual electrical outlets are provided about the room, as in a bedroom, and a wall-mounted switch is situated near the door leading to the bedroom. In this arrangement, the said wall switch is electrically connected so as to control one of the electrical outlets in each of said dual outlets.

As a consequence of the above arrangement, it is possible to plug a lamp into the switch-controlled outlet so that the lamp can be turned on and off by the said wall switch. However, a major disadvantage does exist in the above arrangement. That is, more often than not, the wall-switch controlled lamp, especially when located in a bedroom, is located at a point distantly remote from the said wall switch but conveniently close to the bed. As a consequence, upon entering the bedroom at night the wall switch is employed to turn on the remotely situated lamp. However, upon retiring for the night, the lamp, which is conveniently located near the bed, is turned off by means of a switch carried by the lamp itself.

Upon arising the next day, the lamp is permitted to remain in its off condition because of the natural sunlight. Consequently, upon re-entering the bedroom on the following night it becomes impossible to turn on the remotely situated lamp by means of the wall mounted switch because the circuit leading to the lamp has been left open at the lamp switch the previous night. This then requires the person to grope through the dark until the lamp switch is found and closed.

In view of the above, it is apparent that a wall mounted room switch is almost totally ineffective for its intended purpose.

Accordingly, a general object of this invention is to provide electrical circuitry which will enable the energization and de-energization of a remotely situated electrical load from a point which is remote from said electrical load as well as from a switch device carried by said load or in close proximity thereto.

Another object of this invention is to provide apparatus defining electrical circuitry which will enable the conversion of the electrical circuitry presently provided in homes, as described above, so as to enable switching operations in accordance with the above general object of this invention.

A further object of this invention is to provide a switch device which, when included within the circuitry hereinafter to be described, can be included within a lamp assembly in order to perform the switching functions described in accordance with the general object of this invention.

Other more specific objects and advantages of this invention will become apparent when reference is made to the following description considered in conjunction with the drawings wherein.

Figure 1:
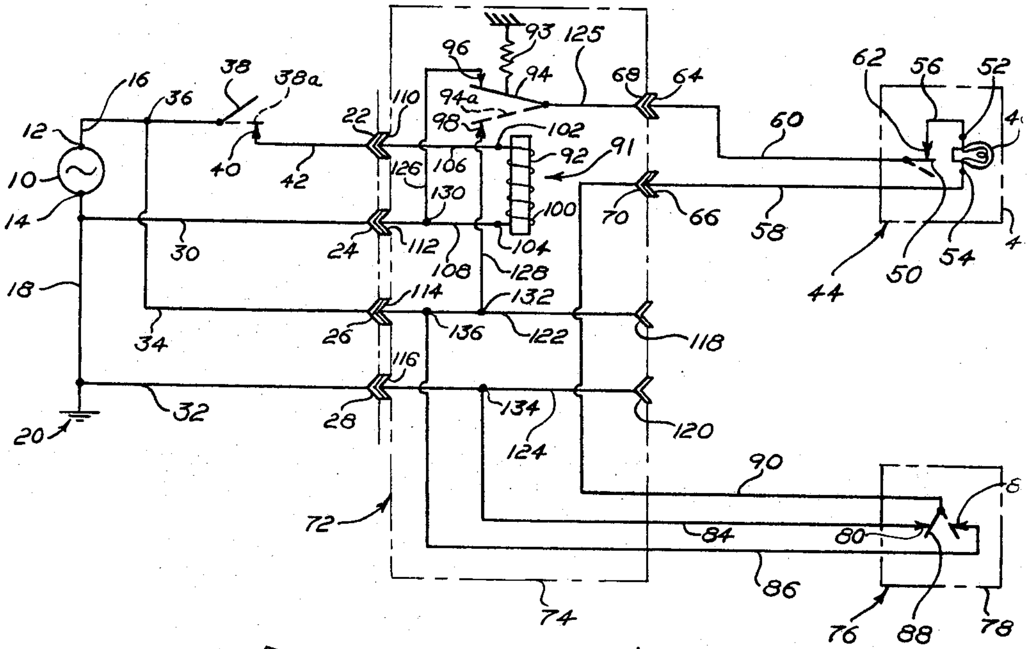
FIGURE 1 is a schematic wiring diagram illustrating one embodiment of a switching circuit constructed in accordance with the teachings of this invention.
Figures 7, 8, 9:
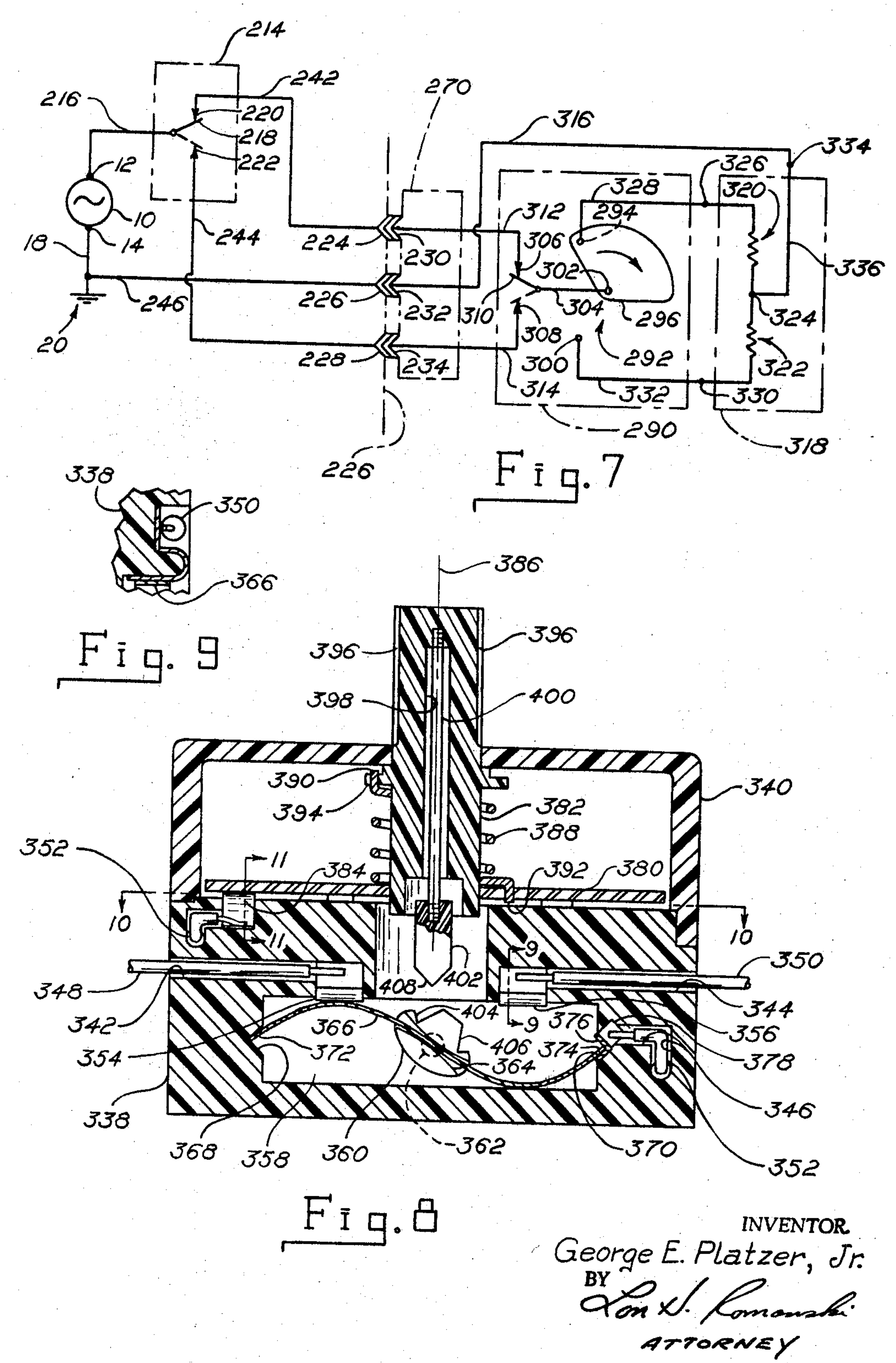
FIGURE 7 is a schematic wiring diagram based on that as shown by FIGURE 5 but containing additional means for controlling selective loads such as a multiple-filament bulb.
FIGURE 8 is an axial cross-sectional view of a switch assembly capable of performing the multiple switch function as required by the circuitry of FIGURE 7.
Figure 10:
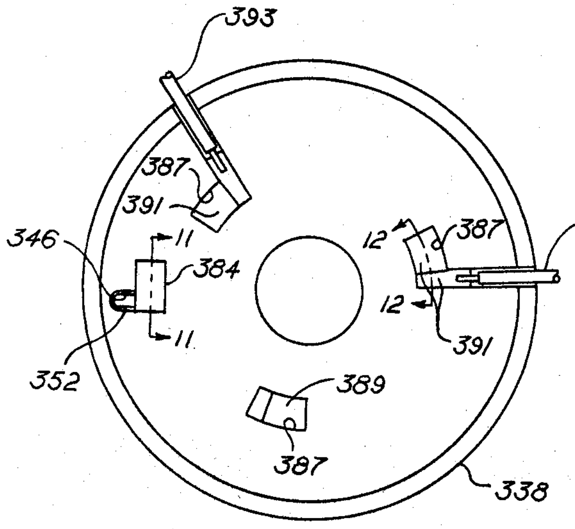
Figure 11:
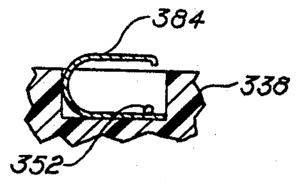
Figure 12:
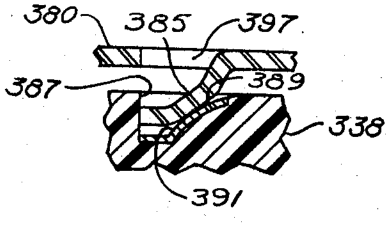
Figure 13:
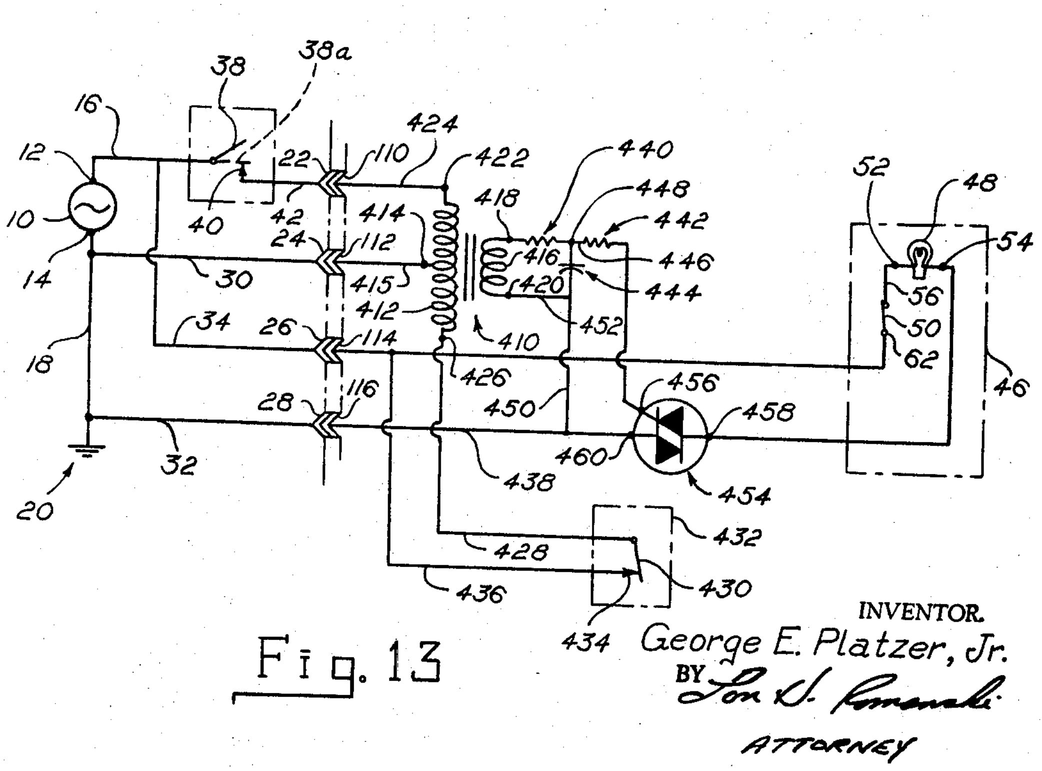

FIGURES 9, 10 and 11 are cross-sectional views taken generally on the planes of lines 9—9, 10—10 and 11—11, respectively, of FIGURE 8 and looking in the direction of the arrows;

FIGURE 12 is a fragmentary cross-sectional view taken generally on the plane of line 12—12 of FIGURE 10 and looking in the direction of the arrows; and FIGURE 13 is a schematic wiring diagram illustrating a further modification of the invention as shown by FIGURE 1.

Referring now in greater detail to the drawings, FIGURE 1 illustrates the invention as applied to a home having conventional A.C. circuitry therein. A source of A.C. electrical potential 10 is illustrated as having output terminals 12 and 14 to which are connected electrical conductors 16 and 18, respectively. Conductor 18, as illustrated at 20, is also connected to ground potential.

The individual receptacles of a conventional dual electrical wall outlet are illustrated as at 22, 24, 26 and 28. For purposes of discussion let it be assumed that receptacles or contacts 22 and 24 cooperate to form the upper outlet and contacts 26 and 28 form the lower outlet of said dual outlet. Contacts 24 and 28 are each electrically connected to conductor 18 by means of conductors 30 and 32, respectively, while contact 26 is electrically connected to conductor 16 by a conductor 34 as at 36.

Conductor 16 terminates in a manually positioned switch 38 which can be considered as being a conventional wall-mounted light switch. Switch 38, when moved to the dash-line position shown at 38_a_ engages a cooperating contact 40, connected to a conductor 42 and contact 22, and completes the circuit between contact 22 and terminal 12 of source 10.

A lamp assembly 44, illustrated generally by the phantom line 46, is comprised of a light bulb (electrical load) 48 and a conventional manually positioned electrical switch 50. The light bulb 48 has its terminals 52 and 54 electrically connected to conductors 56 and 58, respectively. Switch 50 is continually connected to a conductor 60 and adapted to at times engage a contact 62 of conductor 56. Conductors 58 and 60 are provided with a male type prong or contact 66 and 64, respectively, which form the male plug of a conventional "lamp cord" and are adapted for insertion into cooperating receptacle contacts 68 and 70 of an adapter 72 indicated generally by the phantom line 74. It should be noted that adapter 72 also includes a manually actuated single pole double throw auxiliary switch assembly indicated generally at 76 by the phantom line 78. Switch assembly 76 is intended to be, if necessary, remotely situated with respect to the main portion of adapter 72, designated by line 74, so as to be at a convenient location with respect, for example, the bed in order to enable operation thereof at time of retiring.

Switch assembly 76 is comprised of electrical contacts 80 and 82, which are respectively connected to conductors 84 and 86, and a manually positioned switch member 88 which is connected to contact 70 by means of conductor 90.

Adapter 72 is comprised of a relay 91, having a core 92 and armature-switch member 94, and contacts 96 and 98. A coil 100 about core 92 is provided with terminals 102 and 104 which are respectively connected to conductors 106 and 108 terminating in male-type prongs or contacts 110 and 112.

Adapter 72 is also provided with male-type prongs or contacts 114 and 116 as well as receptacle type contacts 118 and 120. As shown, contacts 114 and 116 are respectively electrically connected to contacts 118 and 120 by means of conductors 122 and 124. Contacts 96 and 98 are respectively connected to conductors 108 and 122 by means of conductors 126 and 128 as at 130 and 132, while contacts 80 and 82 are respectively connected to conductors 124 and 122 by means of conductors 84 and 86 as at 134 and 136.

The armature-positioned contact 94 of the relay 91 is normally held closed against contact 96 as by a spring schematically illustrated at 93 anchored to a suitable support which may in fact be a portion of a commercially available relay assembly or part of the supporting structure comprising the adapter 72.

*Operation*

The operation of the invention as disclosed in FIGURE 1 is as follows:

*Condition–1.*—When the wall switch 38 is in the position shown, the circuit from source 10 to relay winding is open and relay 91 is de-energized. Consequently, switch 94 is held in its upper position against contact 96. If at this time the lamp switch 50 is permitted to remain in its closed position against contact 62, and auxiliary switch member 88 is moved against contact 80, as shown, both terminals 52 and 54 of lamp bulb 48 are placed at ground potential and the lamp bulb is off.

*Condition–2.*—Assuming now that the wall switch 38 is permitted to remain in the position shown, it can be seen that if the auxiliary switch member 88 is moved against contact 82 a current path is established through lamp bulb 48. This current path is described by terminal 12 of source 10, conductors 16, 34, 122 and 86, contact 82, switch member 88, conductors 90 and 58, bulb 48, conductor 56, lamp switch 50 conductors 60 and 125, switch 94, contact 96, conductors 126, 108, 30 and 18 and then to terminal 14 of source 10.

In view of the above it can be seen that with the wall switch 38 in open position lamp bulb 48 can be selectively energized and de-energized by use of the auxiliary switch assembly 76.

*Condition–3.*—If switch member 88 is left against contact 82, as described above with regard to Condition–2, and wall switch 38 is moved to a closed position against contact 40, as illustrated at 38*a*, then terminals 52 and 54 of lamp 48 are again placed at equal electrical potential and the bulb 48 is thereby extinguished. That is, at this time closure of switch 38 energizes relay 91 causing switch 94 to move downwardly to the position illustrated in dash line at 94*a* against contact 98. The circuit from terminal 54 of bulb 48 is completed through switch member 88 and contact 82, as previously described, to terminal 12 of the source 10. However, because of the closure of wall switch 38, terminal 52 of bulb 48 is now connected to the same terminal 12. The circuit from terminal 52 is completed through conductor 56, contact 62, lamp switch 50, conductors 60 and 125, switch 94 (in position 94*a*), contact 98, conductors 128, 122 and 34 and 16 to terminal 12 of source 10. Because of the equal potentials at bulb terminals 52 and 54, the bulb is once more extinguished.

*Condition–4.*—The next condition of operation is leaving the wall switch 38 closed against contact 40 and moving the auxiliary switch member 88 back to contact 80. At this time the circuit from bulb terminal 52 to terminal 12 of source 10 remains the same as described with regard to Condition–3. However, because of switch 88 being moved against contact 80, a circuit is once again established between terminal 54 of bulb 48 and terminal 14 of source 10. This circuit is, of course, comprised of conductors 58 and 90, switch 88, contact 80, and conductors 84, 124, 32 and 18 to terminal 14. Accordingly, terminals 52 and 54 of bulb 48 are respectively electrically connected to terminals 12 and 14 of source 10 thereby creating an electrical potential thereacross and energizing bulb 48.

In view of the above, it can be seen that bulb 48 of lamp assembly 44 can be energized and de-energized by either switch 38 or 88 without regard to their respective positions and that the subsequent de-energization or energiaztion can be carried out by either switch 38 or 88, again without regard to their respective positions.

Figure 2:
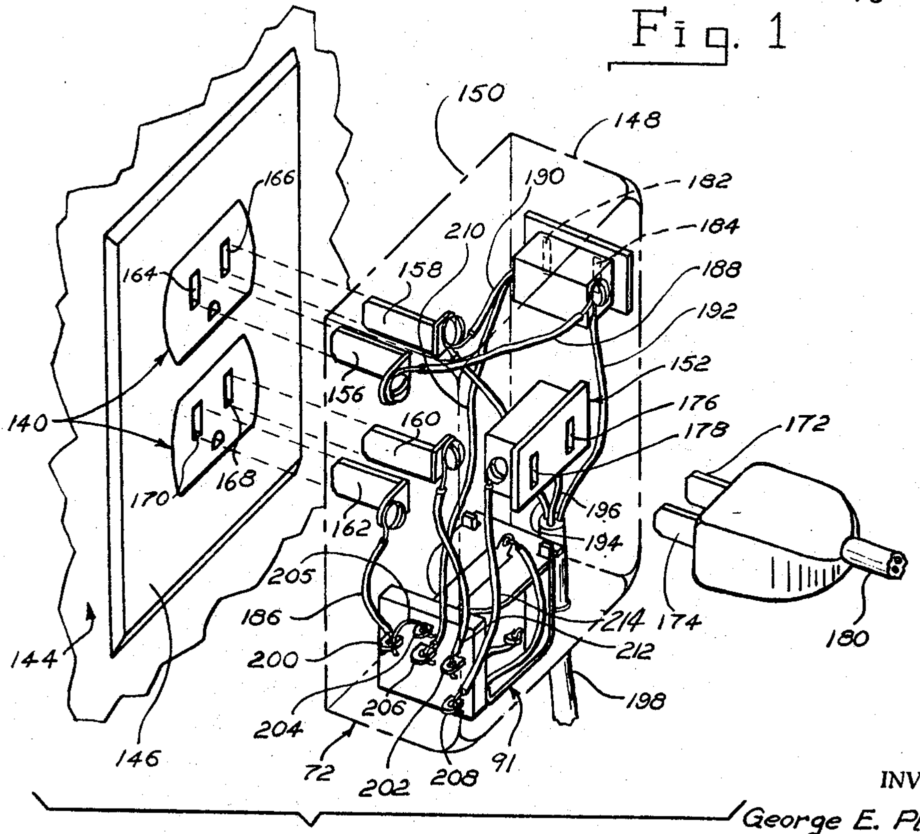
FIGURE 2 is a perspective view of an adapter assembly embodying a portion of the circuitry shown in FIGURE 1.

In order to easily adapt the invention as disclosed by FIGURE 1, it is contemplated that a simple adapter could be constructed generally in accordance with that as shown in FIGURE 2.

As shown in FIGURE 2, a conventional dual wall outlet 140 is situated in a wall portion 144 and has the usual cover plate 146 suitably secured thereto. A suitable housing or cover 148 outlined in phantom line, having a back plate 150, contains the relay assembly 91 as well as a "switched" outlet or receptacle 152 and a "continuous" or unswitched outlet 154. Male type prongs or contacts 156 and 158 correspond to male contacts 116 and 114 of FIGURE 1 and similarly contacts 160 and 162 correspond to contacts 110 and 112 of FIGURE 1. Likewise, receptacle type contacts 164, 166 and contacts 168, 170 of the dual outlet 140, correspond to contacts 28, 26 and 22, 24 of FIGURE 1, respectively.

The various conductors illustrated in FIGURE 2 also have their counterparts in the schematic diagram of FIGURE 1. For example, conductors 188 and 190 are equivalent to conductors 124 and 122 while conductors 192, 194 and 196 of the three-conductor cable 198 correspond to conductors 84, 86 and 90. Relay assembly 91, as illustrated in FIGURE 2, is provided with a plurality of terminals 200, 202, 204, 206 and 208. Terminal 200 corresponds to terminal point 104 and therefore conductor 186 corersponds to conductor 108 of FIGURE 1. Terminal 204 corresponds to a terminal point of contact 96 (FIGURE 1) and conductor 205 connected thereto corresponds to conductor 126 (FIGURE 1). Terminal 206 corresponds to a terminal point of contact 98 (FIGURE 1) and conductor 210, connected thereto and leading from contact 158, coresponds to conductor 128 of FIGURE 1, while terminal 202 and conductor 212 respectively correspond to terminal point 102 and conductor 106 of FIGURE 1. A fifth terminal 208 serves to electrically join two conductor segments 214 and 216 so as to collectively correspond to conductor 125 of FIGURE 1.

A lamp cord 180, containing conductors 58 and 60 of FIGURE 1, has male type contacts 172 and 174, corresponding to contacts 64 and 66, which are adapted to be received in the receptacle contacts 176 and 178 of switched outlet 152. Contacts 68 and 70 of FIGURE 1, of course, correspond to contacts 176 and 178.

In one successful embodiment of the invention as disclosed by FIGURE 2, the following commercially available components were employed:

| | |
|---|---|
| Relay assembly **91** ---- | R.B.M. type 84.907 SPDT 110 v. AS. relay. |
| Switch assembly **76** --- | Arrow-Hart & Hegman Type 21350EH SPDT switch. |
| Outlets **152** and **154** --- | Cinch-Jones #2R2 2 pole 110 v. female socket. |
| Contacts **156**, **158** and **160**, **162** ----- | Cinch-Jones #61M 2 pole 110 v. male plug. |

Figure 3:
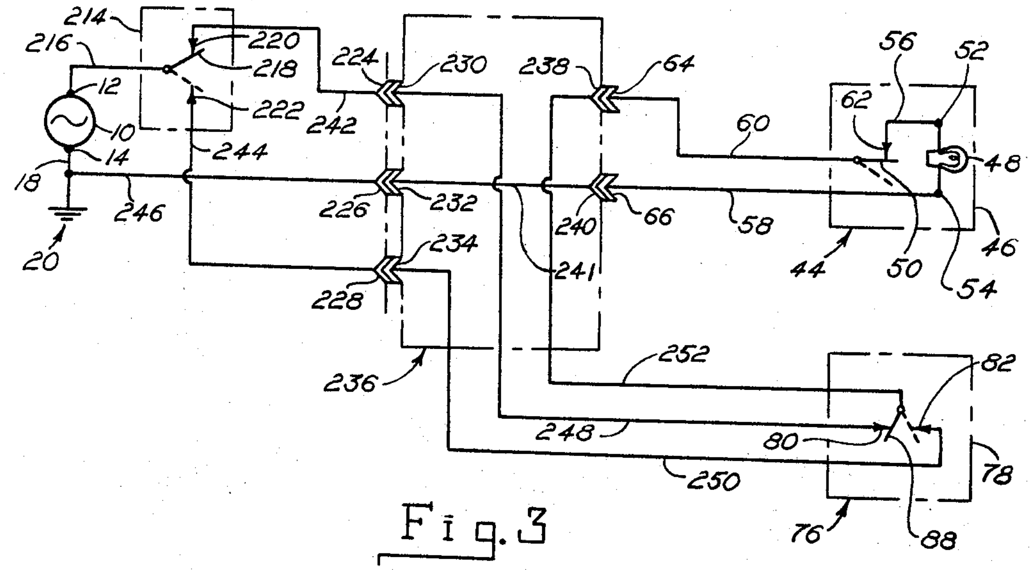
FIGURE 3 is a schematic wiring diagram illustrating a second embodiment of a switching circuit constructed in accordance with the teachings of this invention.

The invention as disclosed by FIGURES 1 and 2 enables the adaption of the conventional home wiring system to the practice of the invention. However, the invention, as herein disclosed, also contemplates a novel modification of the home wiring system, either in existing structures or new structures under construction, in order to practice the invention in a form slightly different from that as shown by FIGURES 1 and 2. FIGURE 3 schematically illustrates one such embodiment and all elements therein which are like or similar to those of FIGURE 1 or 2 are identified with like reference numerals.

Referring now in greater detail to FIGURE 3, a single pole double throw switch assembly 214 is illustrated as being electrically connected by a conductor 216 to output terminal 12 of source 10. Switch assembly 214 is preferably mounted on the wall of a room and in close proximity to the entrance thereto. As schematically illustrated, switch assembly 214 is comprised of a movable switch member 218 and switch contacts 220 and 22.

The room or enclosure is also provided with a special poled electrical outlet which is comprised of outlet contacts 224, 226 and 228 arranged with respect to each other in a geometric pattern which permits the reception of only a male plug which is provided with prong-like contacts 230, 232 and 234 arranged in a complementary geometric pattern.

Male type contacts 230, 232 and 234 are part of an adapter assembly 236 which includes receptacle type (female) contacts 238 and 240 adapted to receive co-operating prong-type contacts 64 and 66 of the lamp assembly 44. Adapter assembly 236, as in FIGURES 1 and 2, also contemplates the use of a remotely situated auxiliary switch assembly 76.

As is evident in FIGURE 3, contacts 220 and 222 of wall switch 214 are electrically connected to contacts 224 and 228 of the poled wall outlet by means of conductors 242 and 244, respectively. The third contact 226 of the poled wall outlet is electrically connected to output terminal 14 as by means of conductors 246 and 18.

Contacts 80 and 82 of remote switch assembly 76 are electrically connected to male contacts 230 and 234 by conductors 248 and 250, respectively, while movable switch member 88 is connected to contact 238 by conductor 252.

The operation of the circuitry shown in FIGURE 3 is as follows. With switch members 218 and 88 closed against contacts 220 and 80, respectively, the circuitry through lamp 48 is closed and lamp 48 is energized. At this time the closed circuit is described by terminal 12, conductor 216, switch member 218, contact 220, conductor 242, contacts 224, 230, conductor 248, contact 80, switch member 88, conductor 252, contacts 238, 64, conductor 60, lamp switch member 50, contact 62, conductor 56, terminal 52, bulb 48, terminal 54, conductor 58, contacts 66, 240, conductor 241, contacts 232, 226, conductors 246, 18 and terminal 14 of source 10. If auxiliary switch member 88 is then moved to the dash-line position against contact 82, the bulb or lamp 48 becomes de-energized because the previously-described circuit becomes opened as between conductors 248 and 252.

However, if switch member 88 is permitted to remain against contact 82, it can be seen that the bulb 48 can again be energized by moving the wall switch member 218 from contact 220 to contact 222. At this time the circuitry from terminal 54 of lamp assembly 44 to terminal 14 of source 10 remains unchanged. However, conductor 216 and terminal 12 are placed in series with conductor 244, contacts 228, 234, conductor 250, contact 82, switch member 88, conductor 252, contacts 238, 64, conductor 60, switch 50, contact 62, conductor 56 and lamp bulb terminal 52.

In view of the above, it can be seen that bulb 48 can be energized and de-energized by either auxiliary switch member 88 or wall switch member 218 without any dependence on the position of the other switch member.

Figure 4:
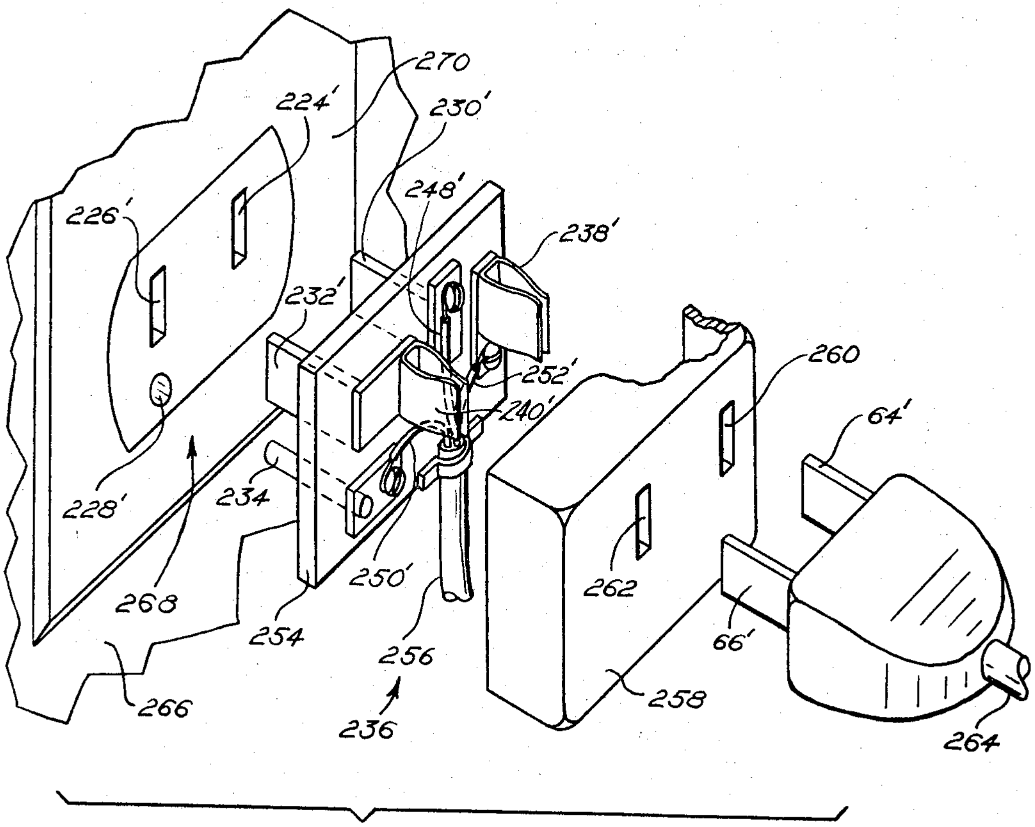
FIGURE 4 is a perspective view of an adapter assembly embodying a portion of the circuitry shown in FIGURE 3.

FIGURE 4 illustrates, in perspective view, an embodiment of the adapter assembly 236 of FIGURE 3, in partially exploded relationship. All elements which are either like or functionally similar to those of FIGURE 3 are identified with like primed reference numerals. A mounting panel 254 of suitable insulating material, serves to carry the various contacts as well as cable 256 which includes conductors 252′, 248′ and 250′ leading to the remote auxiliary switch assembly 76 of FIGURE 3.

A cover 258, removably secured (shown in a removed condition) to the panel 254 is provided with suitable openings 260 and 262 permitting the insertion therethrough of male prongs 64′ and 66′ in order to effect engagement with contacts 238′ and 240′. Prongs 64′ and 66′ are, of course, respectively connected to conductors 60 and 58 as illustrated in FIGURE 3 and contained in a suitable lamp cord or cable 264.

An outlet 268, suitably mounted in a portion of a wall 266 of the enclosure and provided with a cover plate 270, is comprised of polarized contacts 224′, 266′ and 228′ adapted to receive male contacts 230′, 232′ and 234′ of adapter assembly 236.

Figures 5, 6:
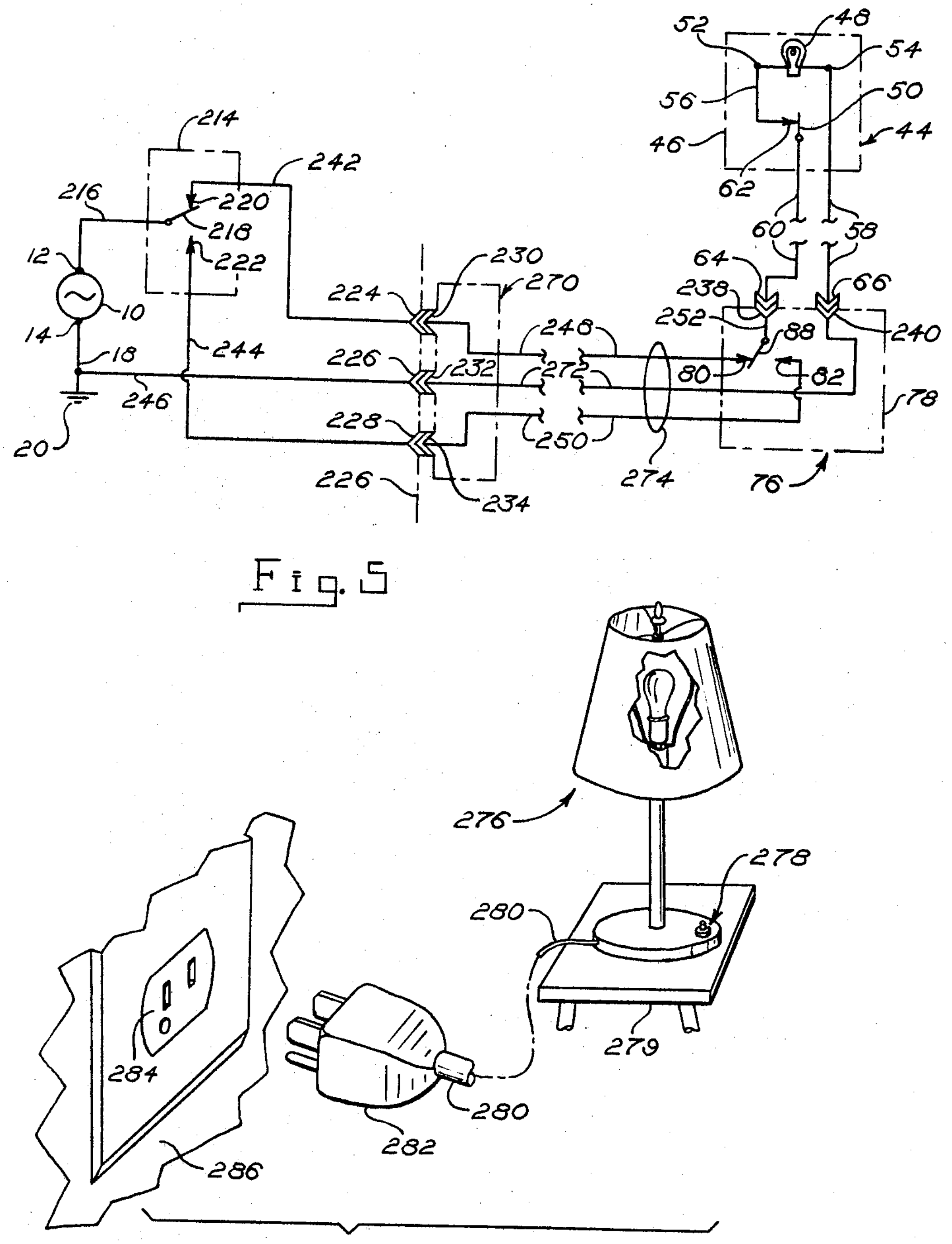
FIGURE 5 is a schematic wiring diagram of a modified form of the invention as shown by FIGURE 3.
FIGURE 6 is a fragmentary pictorial illustration, in perspective, of a lamp assembly as contemplated by the circuitry of FIGURE 5.

FIGURE 5 is a slight modification of the invention as illustrated in FIGURES 3 and 4. In the circuitry of FIGURE 5, all elements which are like or similar to those of FIGURE 3 are identified with like reference numerals. The basic difference between the invention as disclosed by FIGURES 3 and 5 is that in the embodiment of FIGURE 5, male contacts 230, 232, and 234 are contained in a special three-pronged or polarized plug 270 which is received by the wall outlet and which has a three-conductor cable 274 (comprised of conductors 248, 272 and 250) leading to the remote auxiliary switch assembly 76 which includes the outlet receptacles 238 and 240. This permits the use of a relatively long cable 272 and the plugging in of a conventional lamp cord plug into the switch assembly 76 at a distance remote from the wall outlet. A comparison of FIGURES 3 and 5 will show that conductors 241 and 272 are equivalent to each other. Further, it should also be observed that the switch assembly 76 can be combined with the lamp assembly 44 thereby eliminating the need of contacts 64, 66, 238 and 240.

FIGURE 6 illustrates, somewhat pictorially, a lamp assembly 276 which includes a remote or auxiliary switch assembly 278 as generally suggested by FIGURE 5. Lamp assembly 276, illustrated as being situated on a table 279, has a three-conductor cable or cord 280 which is fitted with a special polarized plug 282 adapted to be received within the electrical outlet 284 which may be mounted in the wall 286 of an enclosure.

The arrangement of FIGURE 6 contemplates not only a situation wherein an auxiliary switch is included in the lamp assembly but also a situation wherein the lamp assembly is of the type capable of accepting and energizing a multiple-filament bulb in order to produce varying levels of illumination. FIGURE 7 is a schematic wiring diagram of such a proposed switch assembly and multiple-filament bulb. All elements which are like or similar to those of FIGURE 5 are identified with like reference numerals.

Referring to FIGURE 7, a special switch 290 is illustrated as comprising a single pole double throw switch member 310 which is connected to a filament control portion 292, as by a conductor 304 connected to a pivotal conductor 302 on which a rotary switch segment 296 is permitted to rotate. Contacts 306 and 308 are electrically connected to male type contracts 230 and 234 by means of conductors 312 and 314, respectively. The switch assembly 290 also includes stationary contacts 294 and 300 which are positioned so as to be selectively engaged by switch segment contact 296.

The multiple-filament bulb, often referred to as a three-way bulb, is schematically illustrated at 318 as comprising filaments 320 and 322 which are serially connected at a common terminal 324 and respectively connected to terminals 326 and 330. Terminals 326 and 330 are in continuous electrical circuit with contacts 294 and 300 by means of conductors 328 and 332, respectively. The third terminal 334 of the bulb 318 serves to connect conductor 316 to conductor 336 which leads to the common filament terminal 324. It should, of course, be appreciated that terminals 334, 326 and 300 would, in a lamp assembly, be located in the bulb-receiving socket.

With the elements in the positions shown, the circuit through the low intensity filament 320 is completed and defined by the following: wall switch 218, conductors 242, 312, switch member 310, conductor 304, segment contact 296, contact 294, conductor 328, filament 320, common terminal 324, and conductors 336, 316, 246, and 18.

When the segmental contact 296 is rotated to where it engages contact 300, the higher intensity filament 322 is placed in circuit while filament 320 is taken out of circuit. The circuitry is completed as described above with reference to filament 320 except that filament 322 is now substituted for filament 320.

Finally, when segmental contact 296 is rotated to a position wherein it simultaneously engages both contacts 294 and 300 parallel circuits are established through filaments 320 and 322. This, of course, creates the highest intensity. It should also be pointed out that if switch member 310 should be moved to contact 308, the circuit to the bulb 318 would be opened and the bulb would be de-energized. However, if switch member 218 was to be subsequently moved to contact 222 the de-energized bulb 318 would again become energized.

FIGURE 8 is a longitudinal cross-sectional view of one form of switch assembly schematically illustrated at 290 of FIGURE 7. As illustrated in FIGURE 8, the switch assembly 290 is comprised of a lower body 338 of suitable insulating material which may be of generally cylindrical configuration and formed to accept an insulating cup shaped cover 340.

Body 338 has a plurality of suitable passages 342, 344 and 346 formed therein for receiving conductors 348, 350 and 352, respectively. The ends of conductors 348 and 350 are suitably secured, as by soldering, to generally downwardly depending contacts 354 and 356.

A chamber 358, formed in body 338, is provided in order to accept a rotary member 360 which is pivotally mounted, as at 362, to a portion of the wall defining chamber 358. Rotary member 360 has a slot 364 formed therein for the reception of an elongated electrically conductive leaf spring 366. Generally V-shaped notches 368 and 370, formed in chamber 358, receive, in abutting engagement, ends 372 and 374 of spring 366. As will be noted, a generally V-shaped contact 376 is held between notch or recess 370 and end 374 of spring contact 366. Conductor 352 is connected to contact 376 by means of an integrally formed tab 378. The other end of conductor 352 is suitably secured to a brush-type contact 384 which is in continuous electrical engagement with a rotary disc member 380.

The rotary disc-like member 380, preferably formed of metal, is supported atop body 338 and about a cylindrical push button member 382. Disc member 380 is provided with three downwardly depending cam-like portions 385 which are secured to the underside of disc 380 and spaced at 120 degrees about the axis 386 of pushbutton 382.

A coiled combination torsion and compression spring 388, situated about pushbutton body 382, has its ends 390 and 392 received within suitable aperatures formed in a flange portion 394 of button body 382 and disc member 380, respectively. Button body 382 is also preferably provided with axially directed fluted portions 396 in order to enhance easy rotation of the push button 382 and disc 380.

As button body 382 is grasped and rotated about axis 386, the force is transmitted through spring 388 causing disc 380 to be rotated. As will become more evident from FIGURES 10 and 12, plate 380 will undergo a snap action. That is, because of the compression of spring 388, the legs or cam-like portions 385 secured to plate 380 tend to remain in the cam recesses 387. This tendency continues until the torsional force of spring 388 is sufficient to overcome the compression force of spring 388 at which time plate 380 will rotate 120 degrees so that each of cam portions 385 progress to the next succeeding recesses 387.

An elongated opening 398 pushbutton body 382 receives an elongated relatively flexible rod 400 which is suitably secured at its upper end to body 382 and carries an actuating member 402 at its lower end. The actuating member has a V-shaped surface 408 formed at the end thereof which when moved downwardly will strike one of the V-shaped notches 404 or 406 of rotary member 360. Downward movement of member 402 is of course accomplished by depressing pushbutton body 382 against the action of spring 388. As actuating member 402 engages notch 404, further downward movement will cause both flexing of rod 400 and the counterclockwise rotation of rotary member 360. The position that member 360 will assume will be opposite to that as illustrated. At this time leaf spring contact 366 will reverse its bows and achieve engagement with contact 356. The subsequent upward movement of actuator 402 does not have any influence on leaf spring contact 366 since it is stable in either of its two positions.

In view of the above it can be seen that conductors 348 and 350 correspond to conductors 312 and 314 of FIGURE 7 and that contacts 354 and 356 also correspond to contacts 306 and 308. Further, leaf spring contact 366 acts as the single pole double throw switch member 310 of FIGURE 7 while conductor 352 and wiper contact 384 are the respective counterparts of conductor 304 and pivotal conductor 302 of FIGURE 7.

FIGURE 9, a fragmentary cross-sectional view taken on the plane of line 9—9 of FIGURE 8, illustrates contact 356 with the leaf spring contact 366 being actuated to be in engagement therewith. Contact 354 of conductor 348 is of the same configuration as contact 356.

FIGURE 10, a view taken generally on the plane of line 10—10 of FIGURE 8, illustrates the body 338 and the spaced recesses 387. Each of the recesses is spaced at 120 degrees with respect to the next succeeding recess and is provided with an incline or ramp portion 389 which is in the direction of rotation of disc 380. Two of the recesses 387 are provided with electrical contact portions 391 which are respectively electrically connected to conductors 393 and 395. Preferably, as better shown in FIGURE 12, the contacts 391 are formed so as to closely conform to the contour of the respective ramp portions 389.

Two of the depending legs 385 are preferably formed out of the disc 380, as shown by the cut-out 397 of FIGURE 12, and are conductive members functioning as rotatable contacts equivalent to the segmental contact 296 of FIGURE 7, while the third one of the legs is preferably formed of a separate insulating material secured to the disc and functions merely as a force stabilizing member performing no electrical function. Conductors 393 and 395 are, of course, equivalent to conductors 328 and 332 of FIGURE 7.

In addition to the above, FIGURE 13 illustrates a further embodiment of the invention which is in most part a modification of the invention as shown in FIGURE 1. All of the previous embodiments relied exclusively upon mechanical switching means for completing the various circuits whereas the embodiment of FIGURE 13 includes solid state switching means. All elements which are like or similar to those of FIGURE 1 are identified with like reference numerals.

In the embodiment of FIGURE 13, a transformer 410 is provided with a primary winding 412, having a center tap 414, and a secondary winding 416 with terminals 418 and 420. One end of winding 412 is connected as at 422 to conductor 424 leading to male contact 110; the other end of winding 412 is connected, as at 426, to a conductor 428 leading to a switch member 430 of a remote auxiliary switch assembly 432, while center tap 414 is connected to a conductor 415 leading to male contact 112. Switch member 430 is shown in a closed position against a cooperating contact 434 of a conductor 436 leading to male contact 114. The remaining male type contact 116 is electrically connected to a conductor 438 which is in turn connected to terminal 54 of lamp assembly 46.

Secondary winding 416 has its terminal 418 connected serially with resistors 440 and 442. A condenser 444 connected at one end to conductor 446, as at 448, has its other end connected as by a conductor 450 to conductor 438 and, in turn, male contact 116. Terminal 420 is connected to conductor 450 as by a conductor 452.

A Triac 454 has its three terminals 456, 458 and 460 respectively connected to resistor 442 and conductor 438. Basically, a Triac consists of an N-P-N-P switch in parallel with a P-N-P-N switch formed in a single silicon crystal. Its action is similar to two parallel and oppositely poled silican controlled rectifiers. The Triac 454 is provided with a single gate electrode the terminal of which is illustrated at 456. In order to achieve conduction through the Triac 454, there must be a voltage applied across terminals 460 and 458 and a voltage pulse at the control electrode or gate 456.

In the circuitry of FIGURE 13, resistor 440 and condenser 444 comprise a phase shifter as is well known in the art. The purpose of the phase shifter is to shift the phase of the voltage induced into secondary winding 416 from that as exists in the primary winding 412.

The operation of the embodiment of FIGURE 13 is as follows. With both switches 38 and 430 being in closed position, the bulb 48 is in a de-energized state. This occurs because two self-cancelling circuits are completed. One of the circuits is comprised of conductor 16, switch 38, conductor 42 and 424, winding 412 (from terminal 422 to tap 414), conductors 415 and 30 and terminal 14. The other circuit is comprised of conductors 16, 34 and 436, contact 434, switch member 430, conductor 428, winding 412 (from terminal 426 to tap 414), conductors 415 and 30 and terminal 14. It can be seen that the above two described circuits are oppositely directed thereby cancelling any induction into the secondary coil 416. Further, it both switches 38 and 430 are in open position, it is evident that no current flow is experienced through either half of winding 412 and therefore no induction of the secondary winding 416 can occur.

However, if either switch 38 or switch 430 is open with the other being closed, bulb 48 becomes energized. For example, with switches 38 and 430 being in the positions illustrated, no current flow is experienced through the upper half of winding 412 (from terminal 422 to tap 414) because of switch 38 being open. However, a complete circuit does exist through closed switch 430 and the lower half of winding 412 (from terminal 426 to tap 414), Consequently, the primary winding 412 induces a sine wave voltage into secondary winding 416. At the same time a voltage of the same phase is placed across Triac 454 by means of conductors 34, 436, 450, and conductors 18, 32 and 438, and switch member 50. The voltage induced into secondary winding 416, however, undergoes a ninety degree phase shift and is applied to the control electrode or gate 456. Consequently, the Triac 454, by the application of these two voltages, becomes conductive thereby completing the circuit through bulb 48 causing it to become energized.

As will become evident from an inspection of the circuitry of FIGURE 13, a reversal of positions of switches 38 and 430 from that as shown will again result in the energization of bulb 48. Further, it is apparent that, as in the embodiment of FIGURE 1, the transformer 410, Triac 454, resistors 440, 442 and condenser 444 can be packaged into a suitable housing such as the container or cover 148 of FIGURE 2. Likewise, it is contemplated that conductors 428 and 436 would be contained within a single cable assembly similar to cable 198 of FIGURE 2.

Although only five basic embodiments of the invention have been disclosed and described, it is apparent that other embodiments and modifications of the invention are possible within the scope of the appended claims.

I claim:

1. An electric switching circuit for selectively energizing an electrical load having at least first and second load conductors and which is located remote from the output supply conductors of a source of electrical potential having a first switch member in circuit with a first of said output supply conductors for at times completing a first circuit therethrough, comprising a plurality of circuit conductors certain of which are adapted for connection to said electrical load through said load conductors, a first of said circuit conductors being connected to an auxiliary switch and adapted for electrical connection to said first load conductor, said auxiliary switch being adapted to at times complete a second circuit with said first of said output supply conductors and at other times to complete a third circuit with a second of said output supply conductors, a second of said circuit conductors adapted for electrical connection to said second load conductor and having a second switch in series circiut therewith, and means actuated in response to said first switch member completing said first circuit for causing said second switch to become conductive in a manner whereby said second of said load conductors is placed in closed circuit with said first output supply conductor thereby placing said load in condition for energization when said auxiliary switch is made to complete said third circuit with said second of said output supply conductors.

2. An electrical switching circuit for selectively energizing an electrical load which has at least first and second load conductors and is located remote from at least three output supply conductors connected to a source of electrical potential in a manner so as to have two of said three output supply conductors connected to one electrical side of said source and said third output supply conductor connected to another electrical side of said source and wherein a first switch member is in series circuit with said source for at times completing conduction through one of said supply conductors; said switching circuit comprising a first circuit conductor adapted for connection to one of said two output supply conductors; a second circuit conductor adapted for electrical connection to said third output supply conductor; a second switch member having at least two operating positions; a third circuit conductor adapted for electrically connecting said second switch member to said first load conductor; actuating means placed in circuit with said first and second circuit conductors so as to become energized whenever said first switch member is closed to complete electrical conduction therethrough; said actuating means being effective when energized to move said second switch member to one of said two operating positions; said second switch member being effective when moved to a first of said two operating positions to complete a circuit from said third circuit conductor to said second circuit conductor; said second switch member also being effective when moved to a second of said two operating positions to complete a circuit from said third circuit conductor to a fourth circuit conductor adapted for electrical connection to the second of said two output supply conductors; and an auxiliary switch member having at least two operating positions; a fifth circuit conductor electrically connected to said auxiliary switch member and adapted for electrical connection to said second load conductor; sixth and seventh circuit conductors adapted for respective electrical connection through certain of said output supply conductors to opposite electrical sides of said source of electrical potential; whenever said first switch is moved to complete conduction through said first and second circuit conductors, said auxiliary switch member being effective upon being moved to a first of its said two operating positions to complete conduction through said fifth and sixth circuit conductors thereby placing said remote load in series circuit with said source in order to energize said load; said auxiliary switch being further effective, whenever said first switch is moved to complete conduction through said first and second circuit conductors, upon being moved to the second of its said two operating positions to complete conduction through said fifth and seventh circuit conductors thereby placing said remote load in a circuit with said source whereby said load is exposed to only one electrical side of said source thereby precluding energization of said load; whenever said first switch member is moved to a position terminating conduction through said first and second circuit conductors said auxiliary switch member being effective upon being moved to its said first operating position to complete conduction through said fifth and sixth circuit conductors thereby placing said remote load in a circuit with said source whereby said load is exposed to only one electrical side of said source thereby precluding energization of said load; said auxiliary switch being further effective, whenever said first switch member is moved to a position terminating conduction through said first and second circuit conductors, upon being moved to the second of its two operating positions to complete conduction through said fifth and seventh circuit conductors thereby placing said remote load in series circuit with said source in order to energize said load.

3. An electrical switching circuit for selectively energizing an electrical load which has at least first and second load conductors and is located remote from at least three output supply conductors connected to a source of electrical potential in a manner so as to have two of said three output supply conductors connected to one electrical side of said source and said third output supply conductor connected to another electrical side of said source and wherein a first switch member is in series circuit with said source for at times completing conduction through one of said supply conductors; said switch circuit comprising a first circuit conductor adapted for connection to one of said two output supply conductors; a second circuit conductor adapted for electrical connection to said third output supply conductor; a relay operated switch member having at least two operating positions; a third circuit conductor adapted for electrically connecting said relay switch member to said first load conductor; relay means placed in series circuit with said first and second circuit conductors so as to become energized whenever said first switch member is closed to complete electrical conduction therethrough; said relay means being effective when energized to move said second switch member to one of said two operating positions; said relay switch member being effective when moved to a first of said two operating positions to complete a circuit from said third circuit conductor to said second circuit conductor; said relay switch member also being effective when moved to a second of said two operating positions to complete a circuit from said third circuit conductor to a fourth circuit conductor adapted for electrical connection to the second of said two output supply conductors; and an auxiliary switch member having at least two operating positions; a fifth circuit conductor electrically connected to said auxiliary switch member and adapted for electrical connection to said second load conductor; sixth and seventh circuit conductors adapted for respective electrical connection through certain of said output supply conductors to opposite electrical sides of said source of electrical potential; whenever said first switch is moved to complete conduction through said first and second circuit conductors, said auxiliary switch member being effective upon being moved to a first of its said two operating positions to complete conduction through said fifth and sixth circuit conductors thereby placing said remote load in series circuit with said source in order to energize said load; said auxiliary switch being further effective, whenever said first switch is moved to complete conduction through said first and second circuit conductors, upon being moved to the second of its said two operating positions to complete conduction through said fifth and seventh circuit conductors thereby placing said remote load in a circuit with said source whereby said load is exposed to only one electrical side of said source thereby precluding energization of said load; whenever said first switch member is moved to a position terminating conduction through said first and second circuit conductors said auxiliary switch member being effective upon being moved to its said first operating position to complete conduction through said fifth and sixth circuit conductors thereby placing said remote load in a circuit with said source whereby said load is exposed to only one electrical side of said source thereby precluding energization of said load; said auxiliary switch being further effective, when said first switch member is moved to a position terminating conduction through said first and second circuit conductors, upon being moved to the second of its two operating positions to complete conduction through said fifth and seventh circuit conductors thereby placing said remote load in series circuit with said source in order to energize said load.

4. An electric switching circuit for selectively energizing an electrical load which has at least first and second load conductors and is located remote from a source of electrical potential having at least first and second output supply terminals and wherein said source has first and second output supply conductors electrically connected to said first terminal with said first output supply conductor including a first switch member in circuit therewith and third and fourth output supply conductors electrically connected to said second terminal; said switching circuit comprising first, second, third, fourth, fifth, sixth, seventh, eighth, ninth and tenth circuit conductors; a relay coil; said first circuit conductor being adapted for electrical connection between said first output supply conductor and one end of said relay coil; said third circuit conductor being effective for completing an electrical circuit between said third output supply conductor and an other end of said relay coil; a second switch member; said second circuit conductor being effective for completing an electrical connection between said second load conductor and said second switch member; said second switch member having at least two operating positions at least one of which is achieved in response to energization of said relay coil; said sixth circuit conductor being electrically connected to said third circuit condutor and being adapted to complete an electrical circuit through said second switch member when said second switch member is in a second of its said two operating positions; said eighth circuit conductor being adapted for electrical connection to said first load conductor and to a third auxiliary switch member having at least first and second operating positions; said fifth circuit conductor being adapted for electrical connection to said fourth output supply conductor; and said ninth and tenth circuit conductors being respectively electrically connected to said fifth and fourth circuit conductors; said ninth circuit conductor being effective to complete conduction between said eighth and fifth circuit conductors when said third switch member is moved to its said first operating position; and said tenth circuit conductor being effective to complete conduction between said eighth and fourth circuit conductors when said third switch member is moved to its said second operating position.

5. An electric switching circuit according to claim 4 including resilient means for continually urging said second switch member toward its said first operating position.

6. An electric switching circuit according to claim 4 wherein said second switch member is moved to its said second operating position by energization of said relay coil when said first switch member is closed to complete a circuit through said first circuit conductor said third circuit conductor and said relay coil.

References Cited

UNITED STATES PATENTS

| | | | |
|---|---|---|---|
| 941,777 | 11/1909 | Hart | 307—114 |
| 1,322,704 | 11/1919 | Locke | 307—114 |
| 2,201,898 | 5/1940 | Holiday | 307—114 |
| 2,565,075 | 8/1951 | Harcharek | 307—112 |
| 3,119,046 | 1/1964 | Usher | 307—114 X |

ROBERT K. SCHAEFER, *Primary Examiner.*

T. B. JOIKE, *Assistant Examiner.*

U.S. Cl. X.R.

317—123; 307—252